March 4, 1941. L. T. ELIEL ET AL 2,233,696
MARKING POST FOR INTERLOCKING TEMPLETS AND THE LIKE
Filed May 15, 1939
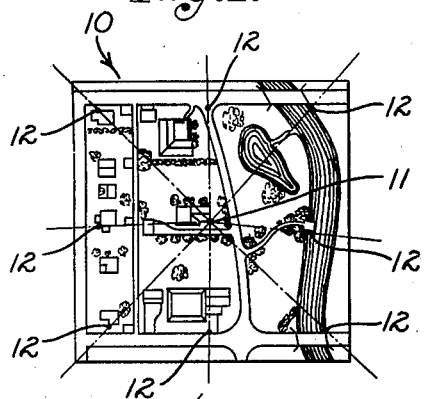
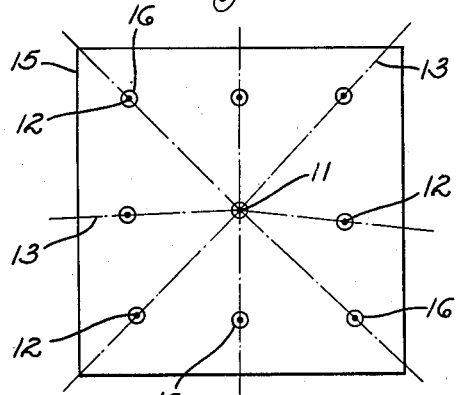
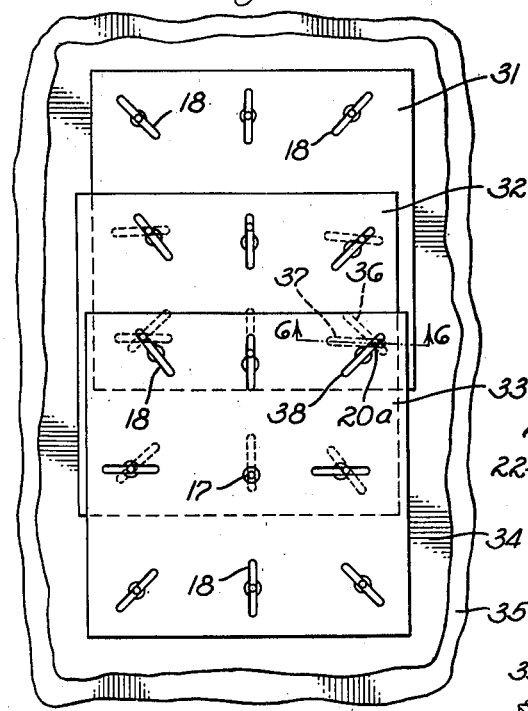
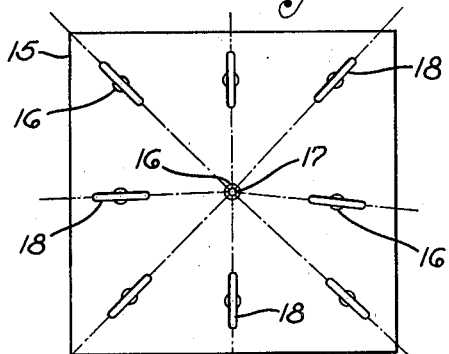
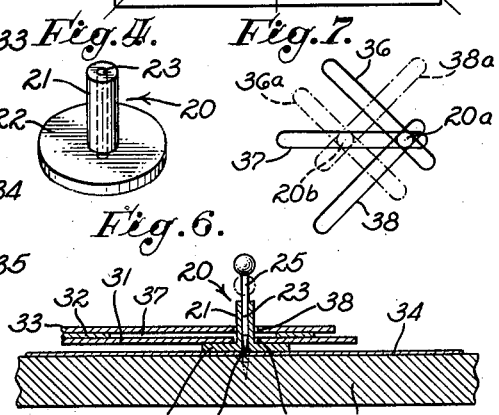
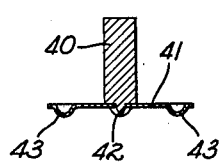
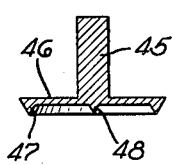
INVENTORS
LEON T. ELIEL
EDWARD R. POLLEY
MAXWELL A. PHILLIPS
BY HARRIS, KIECH, FOSTER & HARRIS
FOR THE FIRM
ATTORNEYS.

Patented Mar. 4, 1941

2,233,696

UNITED STATES PATENT OFFICE 2,233,696

MARKING POST FOR INTERLOCKING TEMPLETS AND THE LIKE

Leon T. Eliel, Pasadena, and Edward R. Polley and Maxwell A. Phillips, Los Angeles, Calif., assignors to Fairchild, Polley & Eliel, Inc., Los Angeles, Calif., a corporation of California Application May 15, 1939, Serial No. 273,666

6 Claims. (Cl. 33—189)

Our invention relates to the art of map making with particular reference to map methods involving the use of slotted templets, and is directed specifically to the construction of a post for cooperation with such templets.

The subject-matter of the present application is a continuation-in-part of our copending application, Serial No. 124,882, filed Feb. 9, 1937, entitled "Method and apparatus for assembling maps."

In the procedure taught by the parent application, templets of cardboard or similar material are placed in overlapping relation on a surface to represent a corresponding series of overlapping photographs taken of the terrain to be mapped. Each of the templets has a central aperture representing the center point of the corresponding photograph and has slots disposed radially thereof representing radial lines at clearly recognizable map points appearing on the photograph. The overlapping templets are interlocked by mechanical means passing through the intersecting slots, the interlocking relationship being such that the positions of said mechanical means as determined by the intersecting slots correspond on the scale of the photographs to the correct positions of the map points they represent. After the templets are properly adjusted, the map points located by mechanical triangulation in the above described manner are plotted on a map surface for guidance in the subsequent development of either a photographic mosaic or line map as desired. Prior to our invention various procedures were employed for locating the intersection points on a map surface. For example, in one practice thumb tacks were employed to interlock the templets, the templets being arranged on a horizontal surface with the thumb tacks extending upwardly through the intersecting slots, and the map points represented by the thumb tacks were located on a map sheet by pressing the map sheet against the templet assembly to cause each of the thumb tacks to puncture the sheet.

The general object of the present invention is to provide a novel post for interlocking, adapted both for interlocking the slotted map templets on a supporting surface and for facilitating marking the location of the post on said surface whereby the surface upon which the templet assembly rests may serve as the map surface. More specifically, we propose to provide a post adapted both for its primary function of movable interlocking templets and for the additional function of facilitating the marking of the corresponding map point on the underlying map surface. A feature of our invention is the conception that if the radial slots are symmetrical with respect to the corresponding radial lines so that each radial line is, in effect, the axis of the corresponding slot, posts having stems of substantial cross-sectional dimension may be employed providing the posts are cylindrical in configuration and fit the slots rather closely, since in such an arrangement the edges of the slots being tangential to the cylindrical surface of the post stem will always maintain the post at a position where the axis of the post will intersect the axis of each of the intersecting slots through which the post stem extends. We are enabled then, without sacrificing the required accuracy, to make the stem large enough to afford access through the post to the point on the underlying supporting surface where the axis of the post intersects that surface.

As set forth in our aforesaid copending application, some of the posts of a templet assembly represent control points of the terrain, the locations of which are plotted on the map surface in advance. The interlocking posts corresponding to these control points are anchored to the map at the corresponding plotted points and a feature of the preferred form of our post is that it is adaptable to this function in a templet assembly as well as the functions of a floating connection between templets.

Further objects of one specific form of our invention are the employment of the post as a guide means for accurately marking such point on the underlying surface, and the combination therewith of a complementary marking means. A further object of another specific form of our invention is to provide a post construction of yielding character that will mark an underlying map surface when deformed by pressure. In a third form of the invention we propose to employ a rigid post structure adapted to mark the underlying map surface when pressed thereagainst.

The above and other objects and advantages of our invention will be apparent in the course of our more detailed description to follow, taken with the accompanying drawing.

In the drawing:

Fig. 1 is a view of an aerial photograph taken by an aerial mapping camera;

Fig. 2 shows a map templet in the process of preparation;

Fig. 3 shows the templet after it has been punched and slotted;

Fig. 4 is a perspective view on an enlarged scale of one of the marking posts employed for interlocking the templets;

Fig. 5 is a plan view showing an interlocked assembly of templets on a map surface;

Fig. 6 is an enlarged fragmentary sectional view taken as indicated by the line 6—6 of Fig. 5 to indicate the manner in which points established by the posts are transferred to the underlying map surface in the preferred practice of our invention;

Fig. 7 is a diagrammatic view showing how the templets shift the interlocking posts;

Fig. 8 is an axial section through a second form of post that may be employed to interlock templets; and Fig. 9 is a similar view of a third form of post.

In the common practice of making maps by the aerial method, an airplane carrying a camera is flown back and forth along adjacent and parallel lines over the terrain to be mapped and consecutive photographs are taken of the terrain in such overlapping relation that one photograph will overlap the preceding photograph by more than 50%, preferably about 60%. The camera is provided with means for establishing or marking the center point of each photograph. In the map making process a number of outlying clearly recognizable points on the photograph are selected both for the purpose of interrelating adjacent photographs and for the purpose of establishing a sufficient number of map points for guidance in the development of the final map. Lines radiating from the center point of each photograph are drawn to these outlying map points so that any map point common to a plurality of photographs will lie at the intersection of the corresponding radial lines of those photographs when the photographs are placed in proper overlapping disposition. Instead of using actual photographs for determining such points of intersection, templets representing the photographs are employed, each templet having a central hole punched therein to represent the center of the photograph and having radial slots representing the corresponding radial lines on the photograph.

In Fig. 1 we show a typical photograph 10 on which the center point 11 is indicated. A number of selected outlying points that are clearly recognizable on the photograph are indicated thereon by dots 12, and corresponding lines 13 radiating from the center point 11 are drawn to these dots as shown. Fig. 2 shows at an early stage of development a templet 15 representing the photograph 10. The center point 11 and the outlying points 12 have been plotted on the templet by any suitable procedure. For example, we may simply place the photograph over the templet and pierce both the photograph and templet with a needle-like instrument at the selected points. To make the various points conspicuous for the sake of reducing the likelihood of error, we prefer to mark a circle 16 around each of the points.

After the points are plotted on the templet, as shown in Fig. 2, a hole 17 is punched at the center point 11, as shown in Fig. 3, and a device described in our parent application having centering means cooperative with the hole 17 is employed to cut radial slots 18 in the templet representing the radial dispositions of the map points of the photograph. While the width of the slots 18 may be equal to the diameter of the hole 17, of course some tolerance must be provided to permit the posts to slide freely along the slots. In practice we find that dimensioning the slots with not greater than .01 inch clearance relative to the posts will not sacrifice accuracy in our results. In fact, such clearance is desirable to allow for slight divergence arising from such factors as camera tilt, and deformation of film or paper. We find also that such clearance normally permits the posts to turn freely so that by testing the posts for freedom to rotate we may locate places in a templet assembly where inaccuracies are involved. Such clearance is not required in the center holes, however. Since the templet-punching device is guided by the hole 17 in aligning the slots in the desired radial disposition, we do not find it necessary in practice to actually mark the photograph with the radial lines 13 nor to show such radial lines on the templet.

The construction of the preferred form of the mechanical means for interlocking the templets may be understood by referring to Figs. 4 and 6. The templet post generally designated 20 has a stem 21 of cylindrical configuration and a relatively thin base 22 that holds the stem in upright position when the post rests on a horizontal surface. The stem, of course, has a diameter to fit into the slots fairly snugly without any significant lateral play. The post 20 is recessed or apertured to permit marking the underlying support surface immediately below the axis of the stem 21. It will be recognized by those skilled in the art that various types of recesses and apertures may be formed in the post for such purpose. In the preferred form of our invention, however, we simply provide an axial bore or passage 23 in the stem 21 through which a suitable marking means may be inserted. A feature of our invention is that by employing a marking pin 25 of a diameter complementary to the diameter of the bore 23, we provide for accurate guidance of the marking means. Since the pin 25 has a relatively sharp point 26 that is accurately concentric, the point will piece the underlying map sheet 34 at precisely the intersection of that axis with the sheet, and since the stem 21 of the post is in tangential contact with the edges of all the slots through which the stem projects, the point 26 of the pin will also represent the intersection of the associated slot axes.

Fig. 5 shows, by way of example, three templets 31, 32, and 33 overlying a map sheet 34 on a supporting surface 35. In practice, of course, a great many more than three templets are employed in a templet assembly. Each of the three templets is shown with the usual center hole 17 and radial slots 18, so that the templets may be interlocked by employing the required number of posts 20. It will be noted that in an extensive series of templets arranged as shown in Fig. 5 each post will usually extend through at least three templets. Some of the posts will pass through three of the slots 18 and other posts will pass through two of the slots 18 and one of the center holes 17. The post 20a, for example, of Fig. 5, shown in section in Fig. 6, extends through a slot 36 in the templet 31, a slot 37 in the templet 32, and a slot 38 in the templet 33.

The base portions 22 of the various posts 20 are relatively smooth to slide freely on the underlying supporting surface to follow adjustments of the templets. The supporting surface may be the surface of the map sheet 34. If the series of templets shown in Fig. 5 is either contracted or extended to conform to the spacing of master control points on the map sheet 34, the various posts 20 will be correspondingly drawn together or moved apart, and in the course of such movement the pattern of post distribution and the relative spacing of the posts will be maintained. The manner in which each of the posts is moved by what may be termed a cam action when the series of templets is adjusted in length may be readily understood by reference to Fig. 7 in which given positions of the slots 36, 37, and 38 with respect to the associated post 20a are shown in full lines, the disposition of the slots corresponding to that shown in Fig. 5. If the series of interlocked templets is contracted in length, the slots 36 and 38 of Fig. 7 will move to the new positions 36a and 38a relative to the slot 37, thereby causing the post 20a to shift leftward along the slot 37 to the dotted line position 20b. Usually the slot 37 will likewise shift laterally with respect to its length as the entire series of templets would contract proportionally. Since the edges of each of the slots are tangential to the post stem, the post will at all stages of its movement be concentric to the intersection of the three slot axes involved and the insertion of a marking means, such as the pin 25 with the concentric point 26, will accurately pierce or otherwise mark the map surface to locate thereon the corresponding map point.

A feature of the above described post is that it may also be employed to represent a control point of the terrain and as such be anchored to the map surface at the corresponding plotted point by fastening means inserted through the post. For example, as indicated in dotted lines in Fig. 6, the pin 25 may be driven into the underlying supporting surface to fix the post in a position concentric to the corresponding control point on the map surface.

Our basic concept includes other forms of marking posts that may be substituted for the preferred form described above. For example, we show in Fig. 8 a marking post having a solid stem 40 that is unitary with a yieldable supporting base 41. Projecting downwardly from the base is a marking point 42 coaxial with the stem 40. The marking point 42 is normally held out of effective contact with the supporting surface upon which the post rests, but the base yields to pressure exerted through the stem 40 to permit the marking point to move into effective contact with the supporting surface when the operator so desires. We may achieve a suitable yielding construction by making the base 41 of flexible sheet metal and forming a plurality of downwardly directed bosses 43 in the sheet metal dimensioned to hold the marking point 42 sufficiently elevated to permit the post to slide freely upon the supporting surface.

Another form of marking post suitable for our purpose, shown in Fig. 9, has a solid stem 45 unitary with a rigid base 46. Projecting downwardly from the under face of the base 46 is a circular ridge 47 concentric to the post 45. Because such a ridge presents an extensive edge to the underlying supporting surface, the post will slide with the required freedom over the supporting surface, and yet the circular edge may be sufficiently sharp to impress a clear-cut circle on the supporting surface whenever the base is pressed towards the surface by force exerted through the stem 45. Since the impressed circular mark is coaxial with the stem 45, it indicates the point on the supporting surface at which the axis of the stem 45 intersects that surface.

Preferably a concentric marking point 48 is also formed on the under side of the base 46 so that pressing the base towards the supporting surface will impress on the supporting surface not only a circular mark but also a point at the axis of the circle. The marking point 48 may extend downward to the plane of the circular edge of the ridge 47 or may be in a slightly retracted position. The circular mark impressed by the ridge 47 will serve to distinguish the concentric point from any other points on the supporting surface accidentally impressed thereon.

For the purpose of the present disclosure, we have described a preferred form of our marking post in specific detail, but those skilled in the art will readily appreciate that various departures may be made from the particular construction above described without departing from the underlying inventive concept. We reserve the right to all such departures that come within the scope of our appended claims.

We claim as our invention:

1. A post for interlocking relatively movable overlapping slotted templets on a supporting surface in a map-making process and for locating on said surface the points of intersection of the templet slots, said post having: a stem dimensioned to fit through and make tangential contact with the edges of intersecting slots of overlapping templets so as to transmit stresses between said templets due to moving said templets relative to each other; and means operable from above the level of said templets to mark the position of said post on said supporting surface.

2. A post for interlocking relatively movable overlapping slotted templets on a supporting surface in a map-making process and for locating on said surface the points of intersection of the templet slots, said post having: a stem dimensioned to fit through and make tangential contact with the edges of intersecting slots of overlapping templets so as to transmit stresses between said templets due to moving said templets relative to each other; and a base adapted for sliding contact with said supporting surface, said base being normal to said stem and of sufficient area to maintain said stem substantially perpendicular to said surface when transmitting stresses between said templets, said stem and base being recessed for access through the post to said supporting surface for marking the supporting surface at the axis of the post.

3. Means for marking on a map surface the location of intersecting slots of overlapping map templets on such surface, said means comprising: a base for sliding contact with said map surface; a cylindrical stem unitary with said base and extending upwardly therefrom to pass through said slots, said stem being dimensioned for tangential contact with all the edges of the associated slots so as to transmit stresses between said templets due to moving said templets relative to each other, there being a passage axially through the stem to the bottom face of said base, said base being normal to said stem and of sufficient area to maintain said stem substantially perpendicular to said surface when transmitting stresses between said templets; and a marking member of shape and dimension complementary to said passage adapted for insertion in the passage, said marking member having a marking point that is maintained in concentric relation to the stem when the marking member is inserted therein.

4. A post for interlocking relatively movable overlapping slotted templets on a supporting surface in a map-making process and for locating on said surface the points of intersection of the templet slots, said post having: a stem dimensioned to fit through and make tangential contact with the edges of intersecting slots of overlapping templets so as to transmit stresses between said templets due to moving said templets relative to each other; a base adapted for sliding upon said supporting surface said base being normal to said stem and of sufficient area to maintain said stem substantially perpendicular to said surface when transmitting stresses between said templets; and a marking means normally supported by said base at a position to be out of marking contact with said supporting surface, said base being of yielding construction whereby force may be exerted through said stem to force said marking means into effective contact with the supporting surface.

5. A post for interlocking relatively movable overlapping slotted templets on a supporting surface in a map-making process and for locating on said surface the points of intersection of the templet slots, said post having: a stem dimensioned to fit through and make tangential contact with the edges of intersecting slots of overlapping templets so as to transmit stresses between said templets due to moving said templets relative to each other; and a base adapted for sliding upon said supporting surface, said base being normal to said stem and of sufficient area to maintain said stem substantially perpendicular to said surface when transmitting stresses between said templets, said base being adapted to mark said supporting surface when pressed thereagainst.

6. A post for interlocking relatively movable overlapping slotted templets into a templet assembly on a supporting surface in a map-making process and adapted either for anchoring the templet assembly to the supporting surface at a predetermined control point or for locating on said surface the point of intersection of the templet slots representing a map point other than a control point, said post having: a stem dimensioned to fit through and make tangential contact with the edges of intersecting slots of overlapping templets so as to transmit stresses between said templets due to moving said templets relative to each other; and a base adapted for sliding contact with said supporting surface said base being normal to said stem and of sufficient area to maintain said stem substantially perpendicular to said surface when transmitting stresses between said templets, said stem and base having an aperture for access through the post to said supporting surface for marking the supporting surface at the axis of the post, said aperture being adapted to receive anchorage means on the supporting surface to anchor the post at a predetermined control point on the supporting surface.

LEON T. ELIEL.
EDWARD R. POLLEY.
MAXWELL A. PHILLIPS.

CERTIFICATE OF CORRECTION.

Patent No. 2,233,696. March 4, 1941.

LEON T. ELIEL, ET AL.

It is hereby certified that error appears in the printed specification of the above numbered patent requiring correction as follows: Page 2, second column, line 43, for the word "piece" read --pierce--; page 3, second column, line 32, claim 1, before "and" insert the words and semicolon --a base adapted for sliding upon said supporting surface, said base being normal to said stem and of sufficient area to maintain said stem substantially perpendicular to said surface when transmitting stresses between said templets;--; and that the said Letters Patent should be read with this correction therein that the same may conform to the record of the case in the Patent Office.

Signed and sealed this 8th day of April, A. D. 1941.

Henry Van Arsdale,
(Seal) Acting Commissioner of Patents.